United States Patent Office.

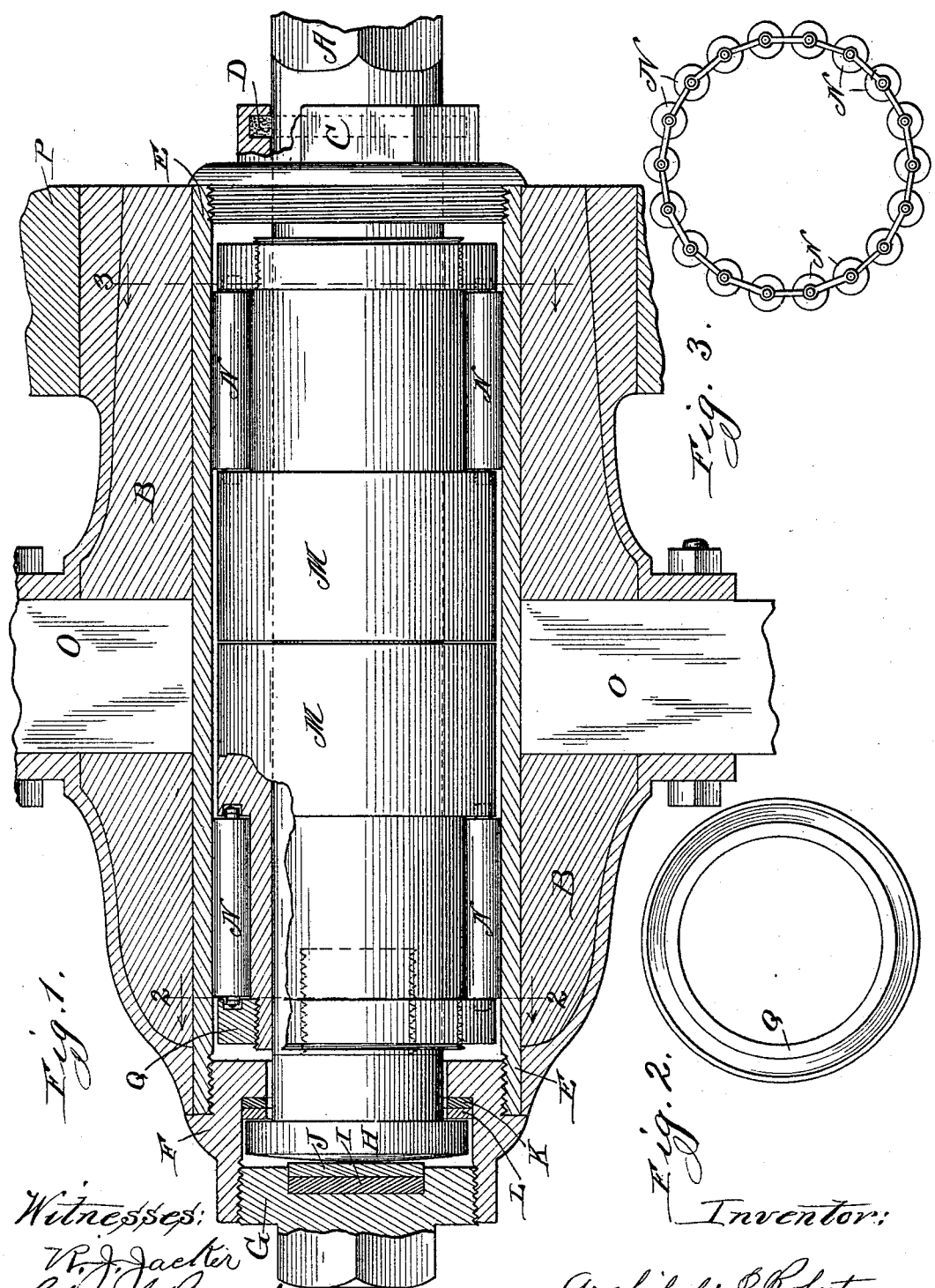

ARCHIBALD J. ROBERTSON, OF CHICAGO, ILLINOIS.

AXLE AND BEARING FOR VEHICLES.

SPECIFICATION forming part of Letters Patent No. 642,720, dated February 6, 1900.

Application filed June 2, 1899. Serial No. 719,136. (No model.)

*To all whom it may concern:*

Be it known that I, ARCHIBALD J. ROBERTSON, a subject of the Queen of Great Britain, and a resident of the city of Chicago, county of Cook, and State of Illinois, have invented certain new and useful Improvements in Means for Constructing Axles and Bearings for Vehicles, as set forth in the following specification.

My invention relates to bearings for vehicles, and has for its object to produce a bearing of great sensitiveness, strength, and durability, the wearing parts of which may be replaced at a minimum cost without interfering with the main structures which compose the parts thereof.

One of the principal features in my device is to furnish elastic end or lateral thrusts between the hub action and the axle. Another novel feature is that the axle proper has no collar, and a further novel feature is that the inward and also the outward thrusts between the axle and hub are taken up in the outer end of the hub. Therefore no collar is needed on the axle to keep the hub in position.

In order to accomplish my purpose, I place a two-part sleeve provided with roller-bearings on an axle. In the end of said axle I fasten a circular nut and screw said nut into or on the end of the axle by the use of a two-prong wrench, the prongs of which are inserted into receptacles made for them in the front of the nut. I then place a metallic sleeve in the hub of the wheel. The inner diameter of this sleeve will just fit the outer periphery of the rollers, which are arranged around the two-part sleeve which is placed on the axle. Said rollers travel in a suitable receptacle made thereon to secure them to each end of this sleeve, which I place in the hub. I fasten a cap by tapping the inner periphery of the sleeve and screwing said caps therein. This incloses the ends of the hub of the wheel. The rear cap encircles the axle, and in the inner periphery thereof I place a dust-seal, which seal revolves on the axle. The front cap is also screwed into the sleeve in the hub and is formed so that the inner side of the circular nut, which nut is fastened to the axle, will come in contact with the outer wall of the member formed in the cap, thus forming a resistance to the outward thrust of the hub and preventing the wheel from coming off the axle. I then screw a nut into the end of the cap mentioned, which nut would come in contact with the outer wall and center of the circular nut, thus furnishing a resistance to the inward thrust of the hub, thereby enabling the circular nut in the end of the axle to perform the office of both the inward and also the outward thrust of the hub. In the inner side of the nut, which is screwed into the said cap, I form a recess, in which I first place an elastic substance, and in this same recess over this elastic substance I place a hardened steel or lignum-vitæ plate, which plate comes in contact with the circular nut mentioned, which nut is of hardened steel, and on the outer side of the member of the cap which comes in contact with the inner side of the circular nut, which nut is fastened in the axle, I place an elastic ring, which encircles the nut-shank. Between this elastic ring and the inner wall of the circular nut I place a ring of hardened steel or other hard substance, which comes in contact with this nut, thus producing an elastic thrust both inwardly and outwardly between the axle and the hub of the wheel, also supplying the hardest of direct contacts, each provided with a cushion, thus securing a minimum wear and an absorbent of sound and reducing friction to a minimum. The nut, the plate, and the ring and also the elastic cushions may be replaced at will, thus replacing all the wearing parts and keeping the wheel and axle in condition with but little expense.

Like letters represent like parts in the accompanying drawings, which form a part hereof, in which—

Figure 1 is a side elevation of a hub with my device inclosed, showing the axle broken off at the rear of the hub; also the rear cap inclosing the hub, said cap screwed into the sleeve, which sleeve is inserted in the hub, and the two-part sleeve in which the roller-bearings are placed situated on the axle. This view also shows a circular nut screwed into the outer end of the axle; also the front cap of the hub screwed into the sleeve, which sleeve is placed in the hub of the wheel; also the outer nut screwed into the end of the cap, the elastic substance and also the hard plate which occupy a recess in the inner end of said nut, said plate in contact with the outer end of the hardened nut, which nut is screwed into the end of the axle; also the elastic substance in the form of a ring situated between the inner wall of the circular nut and the outer wall of the member of the cap, which serves to resist the outward thrust of the hub. A metallic or hard ring is also shown between the outer wall of the elastic ring and the inner wall of the circular nut, which, with the elastic substance, surrounds the shank of the circular nut. This view also shows a line of separation in the longitudinal center of the sleeve which carries the roller-bearings, thus forming said sleeve into two parts when desirable, the object being to relieve the bearing and sleeve from any tendency to bind when rounding curves, the sleeves being loose on the axle. This effect is clearly obvious.

Fig. 2 is a view through line 2 2 in Fig. 1.
Fig. 3 is a line through 3 3 in Fig. 1.

A is an axle.
B is a hub.
C is a rear cap.
D is a dust-guard.
E is a sleeve placed in the hub.
F is a front cap.
G is a nut.
H is a circular nut screwed into the axle.
I is a cushion in nut G.
J is a plate in nut G.
K is a cushion in cap F.
L is a metallic ring.
M M is a two-part sleeve placed on axle A.
N is a roller-bearing situated in a suitable track and surrounding sleeve M M.
O is a spoke, broken off.
P is a driving connection with hub B when the vehicle is propelled by power carried by said vehicle.

I am aware that roller-bearings of many kinds have been used for vehicles and the like, the specific details of construction of all of which I hereby disclaim.

Having thus described my invention, what I claim, and desire to secure by Letters Patent, is—

1. In a vehicle-bearing the combination of axle A, hub B, cap C, dust-guard D, sleeve E; cap F; nut G; nut H; cushion I; plate J; cushion K; ring L; sleeves M M; rollers N, all in combination and substantially as described.

2. A vehicle-bearing in the combination of an axle without a collar a two-part sleeve placed on said axle, said sleeve supplied with a receptacle surrounding the outer periphery thereof; roller-bearings placed in said receptacle and surrounding said sleeve; the circumference of said rollers combined being greater than the circumference of said sleeve; a hub provided with a sleeve, the inner periphery of said sleeve of a size to fit over said rollers; a rear cap encircling said axle and supplied with a dust-guard, said cap fastened to said sleeve in said hub, the front of said hub supplied with a cap, said cap fastened to said sleeve in said hub, said cap supplied with a member to engage the inner wall of a circular nut, said nut fastened to the end of said axle; a nut screwed into the end of said cap, said nut and said member, supplied with cushions, one on each side of said circular nut; a plate between said cushions in said nut, and the outer wall of said circular nut; a ring between said cushion in said member, and the inner wall of said circular nut, substantially as described.

ARCHIBALD J. ROBERTSON.

Witnesses:
CHAS. A. LINDSTROM,
WM. S. BREWSTER.